United States Patent

[11] 3,622,143

| [72] | Inventor | Cornelius W. Van Ranst, Jr.<br>Dearborn, Mich. |
|---|---|---|
| [21] | Appl. No. | 7,494 |
| [22] | Filed | Feb. 2, 1970 |
| [45] | Patented | Nov. 23, 1971 |
| [73] | Assignee | Ford Motor Company<br>Dearborn, Mich. |

[54] SELF-SEALING RESILIENT BUSHING
5 Claims, 3 Drawing Figs.

| [52] | U.S. Cl. | 267/152 |
|---|---|---|
| [51] | Int. Cl. | F16f 1/32 |
| [50] | Field of Search | 267/8, 34, 63, 153, 152 |

[56] References Cited
UNITED STATES PATENTS

| 3,082,998 | 3/1963 | Lange | 267/8 |
|---|---|---|---|
| 3,376,032 | 4/1968 | Schmid | 267/8 |

Primary Examiner—James B. Marbert
Attorneys—John R. Faulkner and Roger E. Erickson ABSTRACT: A self-sealing resilient bushing suitable for use in mounting a bayonet end of an automotive shock absorber to a body mounting bracket. The bushing has a flexible flange portion which resiliently engages the body mounting bracket to seal dirt or other foreign matter from the remainder of the bushing.

PATENTED NOV 23 1971 3,622,143
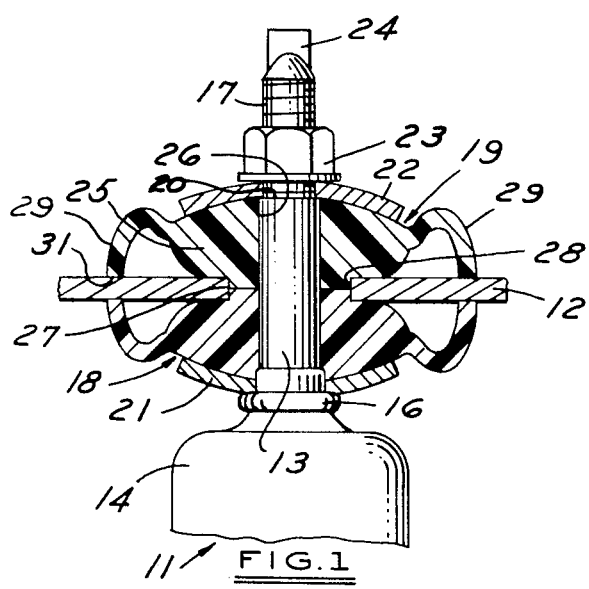
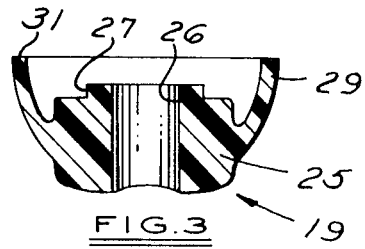
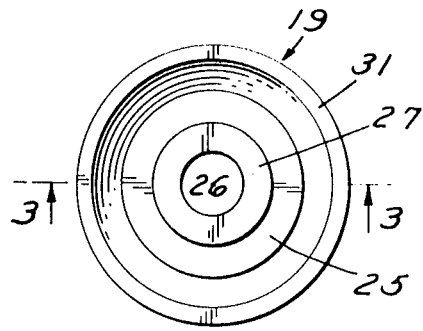
INVENTOR
CORNELIUS W. VAN RANST, JR.
BY John D. Faulkner
Roger E. Erickson
ATTORNEYS

SELF-SEALING RESILIENT BUSHING

BACKGROUND OF THE INVENTION

Automotive hydraulic shock absorbers are commonly installed in a vehicle by means of a stud or bayonet mount. With such a mount the shock absorber piston rod extends through an opening formed in a body mounting bracket. The piston rod is insulated from direct contact with the bracket by a pair of resilient bushings fitted over and beneath the bracket opening and about the piston rod and held in place by fasteners secured to the piston rod.

The location of the shock absorber in the vehicle is generally such that during operation of the vehicle it often becomes covered with abrasive dirt or sand. With many prior art designs this dirt may get between the resilient bushings and the adjacent metal parts. Operation of the vehicle and the resultant flexing of the bushings permits the dirt to enter and progress to the interior of the bushing and eventually to cause sufficient wear permitting audible vibrations between the piston rod and its supporting bracket.

This invention provides a bushing construction that has a peripheral seal to prevent dirt from getting into the bushing interior thereby increasing the bushing life and the reliability of the installation.

The invention further provides a bushing construction having a less flexible resilient main body portion and a more flexible resilient seal portion surrounding the main body portion.

SUMMARY OF THE INVENTION

This invention relates to a bushing for use in resiliently connecting a stud or rod member within an opening formed in a bracket or the like. A bushing constructed in accordance with this invention includes a resilient main body portion and a relatively more flexible cup-shaped flange portion extending radially outwardly and in an axial direction of the bushing.

When the bushing is in an uninstalled free state the axial depth of the flange portion exceeds the corresponding axial dimension of the main body portion so that when the bushing is pressed against a mounting bracket or the like, the flange portion is deformed so that it resiliently and sealingly engages the bracket surface and prevents dirt from getting between the main body portion and the adjacent bracket surface.

BRIEF DESCRIPTION OF THE DRAWINGS

FIG. 1 is a cross-sectional view of a pair of resilient bushings used in mounting the bayonet end of a shock absorber to a body mounting bracket.

FIG. 2 is a top view of the bushing in an uninstalled condition, viewed in the direction of the arrow of FIG. 3.

FIG. 3 is a cross-sectional view taken along line 3—3 of FIG. 2.

DETAILED DESCRIPTION OF A PREFERRED EMBODIMENT

An automotive hydraulic shock absorber 11 mounted to a body mounting bracket 12 is shown in FIG. 1 of the drawings. A piston rod 13 slidably extends from one end of the shock absorber cylinder 14 and includes an abutment means 16 and a threaded end 17. A pair of resilient bushings 18 and 19 are positioned about the piston rod and sandwich the mounting bracket. A pair of retainers 21 and 22 axially enclose the bushings.

Nut 23 threadedly engages end 17 of the piston rod and together with abutment 16 compress retainers 21 and 22 and bushings 18 and 19 against mounting bracket 12 to form a resilient mounting. A shoulder 20 is formed on piston rod 13 which acts as a stop for retainer 22 to prevent nut 23 from being overtightened. Piston rod 13 also includes a flattened end 24 which may be held to prevent turning when tightening nut 23.

The resilient bushings 18 and 19 are identical in construction. Each has a main body portion 25 generally cylindrical in shape, as shown in FIG. 3, with a centrally disposed opening 26 which receives the piston rod 13. A centering boss 27 having a circular shape the same size as bracket opening 28 extends into the opening and engages the corresponding part of the other of the pair of bushings.

A generally conical or cup-shaped dirt seal flange 29 extends from the outer circumference of the main body portion 25. The flange is directed in an axial direction toward the mounting bracket 12 as well as radially outwardly. When the bushing is in an uninstalled free state, as shown in FIG. 3 of the drawings, the flange extends axially a greater distance than the main body portion. When the bushings are installed, as in FIG. 1, the flange is elastically deformed or flexed so its circumferential edge 31 resiliently seals against the adjacent surface of bracket 12. As the reciprocating force acting on the bushings cause deformation of the bushings, the motion is absorbed in the flexible flanges 29 and the seal at edge 31 remains unbroken to prevent entry of road dirt or sand.

The bushings 18 and 19 may be molded from any suitable elastically deformable material, such as a natural rubber compound.

Alterations and modifications may occur to those skilled in the art which are included within the scope of the following claims.

I claim:

1. A resilient mounting bushing for resiliently connecting a stud member to a second member having an orifice receiving said stud member, said bushing comprising:
   a main body portion received about said stud member and engageable with said second member about said orifice,
   a flexible flange portion extending from said main body portion toward said second member, said flange portion having a peripheral edge resiliently and sealing engageable with said second member about the main body portion, said peripheral edge otherwise being unsecured from said second member,
   said flange portion preventing foreign matter from getting between said main body portion and said second member.

2. A bushing according to claim 1 and including:
   said flange portion extending axially a greater distance than said main body portion when said bushing is in an uninstalled free state,
   said flange portion being elastically deformed against said second member when installed to form a self-sustaining resilient seal therebetween.

3. A bushing according to claim 2 wherein:
   said flange portion is integrally formed with said main body portion of an elastomeric material.

4. A resilient mounting bushing used in connecting a first member having a stud element to a second member having an orifice formed therein receiving said stud element, said bushing comprising:
   a main body portion received about said stud element and engageable with said second member,
   a part of said main body extending into the orifice of said second member to space said stud element therefrom,
   a dirt seal flange portion extending from said main body portion being resiliently engageable with and unsecured to said second member to provide a circumferential seal about said orifice,
   said dirt seal portion in the uninstalled state having generally a cup-size shape,
   said dirt seal portion when installed being elastically compressed against said second member to form a motion-absorbing seal about said main body portion of said bushing.

5. A resilient mounting means for connecting the stud end of a shock absorber to a mounting plate member having an orifice formed therein receiving said stud end, a pair of bushings positioned about said stud,
   each of said bushings being engageable with a respective side of said plate member,
   said bushings each including a main body portion and relative more flexible seal portion, said main body portion having a generally circular shape and a centrally disposed opening formed therein, a generally annular flange extending radially outwardly and toward said plate member, said flange having a circumferential edge sealingly engageable with and unsecured to said mounting plate, said flange when uninstalled extending axially past the main body portion, said flange when installed resiliently engaging a side of said mounting plate to seal the main body portion from external dirt, said bushings formed of an elastically deformable material, retaining means axially positioning said pair of bushings about said stud end on either side of said plate member, said bushings being axially compressed between said retainers.